(12) United States Patent
Cirkovic (10) Patent No.: US 8,750,096 B2
(45) Date of Patent: Jun. 10, 2014

(54) METHOD AND APPARATUS FOR IMPROVING DATA INTEGRITY DURING A ROUTER RECOVERY PROCESS

(75) Inventor: Sasha Cirkovic, San Francisco, CA (US)

(73) Assignee: Tellabs Operations, Inc., Naperville, IL (US)

( * ) Notice: Subject to any disclaimer, the term of this patent is extended or adjusted under 35 U.S.C. 154(b) by 258 days.

(21) Appl. No.: 13/168,757

(22) Filed: Jun. 24, 2011

(65) Prior Publication Data

US 2012/0182862 A1     Jul. 19, 2012

Related U.S. Application Data

(60) Provisional application No. 61/432,417, filed on Jan. 13, 2011.

(51) Int. Cl.
*H04L 12/26*       (2006.01)

(52) U.S. Cl.
USPC .......................................... 370/220; 709/238

(58) Field of Classification Search
USPC ................... 370/220, 401; 709/238
See application file for complete search history.

(56) References Cited

U.S. PATENT DOCUMENTS

| | | | | |
|---|---|---|---|---|
| 8,203,934 B2 * | 6/2012 | Savage et al. | ................. | 370/217 |
| 8,218,432 B2 * | 7/2012 | Le Roux et al. | ............... | 370/221 |
| 2004/0078625 A1 * | 4/2004 | Rampuria et al. | ................ | 714/4 |
| 2009/0175280 A1 * | 7/2009 | Berechya et al. | ........ | 370/395.53 |
| 2010/0150020 A1 * | 6/2010 | Rosen et al. | ................... | 370/254 |

OTHER PUBLICATIONS

"Requirements for Pseudo-Wire Emulation Edge-to-Edge (PWE3)" Sep. 2004 The Internet Engineering Task Force—Network Working Group X. XIOA Ed. Riverstone Networks.

* cited by examiner

*Primary Examiner* — Wei Zhao
(74) *Attorney, Agent, or Firm* — James M. Wu; JW Law Group (57) ABSTRACT

An apparatus and method for enhancing data integrity during router recovery using dual-homed host configuration are disclosed. A process of routing resumption, in one embodiment, is able to recover or reset a network element ("NE") such as a primary router from system failure. A first link configured to transmit data packets between the NE and a network device is reestablished. Upon reestablishing a second link configured to transmit data packets between the NE and other NEs, a network discovery process utilizing network reachability protocol is initiated to identify routing paths associated with the NE. A routing table in the NE is updated in accordance with the routing paths. A ready message is issued from the NE to the network device when the routing table is at least partially completed.

9 Claims, 8 Drawing Sheets

METHOD AND APPARATUS FOR IMPROVING DATA INTEGRITY DURING A ROUTER RECOVERY PROCESS

PRIORITY

This application claims the benefit and priority based upon U.S. Provisional Patent Application Ser. No. 61/432,417, filed on Jan. 13, 2011 in the name of the same inventor and entitled "PWE Attachment Circuit Status Monitoring Extension for PWE to VRF Redundancy Deployment Models," hereby incorporated into the present application by reference.

FIELD

The exemplary embodiment(s) of the present invention relates to communications network. More specifically, the exemplary embodiment(s) of the present invention relates to improve data integrity during a router recovery process.

BACKGROUND

A high-speed network environment typically includes network devices such as routers and bridges used for facilitating delivery of information packets and/or data traffic from source devices to destination devices. Information pertaining to the transfer of packet(s) through the network is usually embedded within the packet itself. Each packet traveling through one or more communications networks such as Internet and/or Ethernet can typically be handled independently from other packets in a packet stream or traffic. For example, each router which may include routing, switching, and/or bridging engines processes incoming packets and determines where the packet(s) should be forwarded.

A problem associated with a high-speed computing network is data (or packet) loss due to data connection(s) (or data link) and/or device failure. For example, when data packets are sent to a recipient, the recipient router may drop the data packets because the router is not ready to process and route the data packets. As such, data loss can occur when the link and router are not fully functional at the same time.

SUMMARY

A communication network capable of providing PWE to VRF network application using dual-homing protection for improving data integrity is disclosed. After a primary router is recovered from an earlier device failure, a first link configured to transmit data packets between the primary router and an access switch is reestablished. Upon reestablishing a second link which facilitates data transmission between the primary router and other network elements, a network discovery process using a network reachability protocol is initiated to identify routing paths associated with the primary router. A routing table in the primary router is subsequently updated in accordance with the routing paths. When the routing table, according to a predefined condition, is completed or at least partially completed, a ready message is issued by the primary router to the access switch. The ready message indicates that a switchover or a reversion of network service between primary router and backup router should take place.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of improving network performance during a switchover from a backup router to a primary router using a delay-switching circuit.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, for example, IP type, and those packets (here IP packets) comprise an IP header, a header specific to the transport medium (for example UDP or TCP) and payload data. The IP network may also include a satellite network, for example a DVB-RCS (Digital Video Broadcasting-Return Channel System) network, providing Internet access via satellite, or an SDMB (Satellite Digital Multimedia Broadcast) network, or a terrestrial network, for example a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Embodiments of the present invention illustrate a network system using dual-homed hosts to reduce packet-drop or black holing during a switchover of network service between a backup router and a primary router. After a primary router resumes its routing functionalities from an earlier system failure, a first link configured to transmit data packets between the primary router and an access switch is reestablished. Upon reestablishing a second link able to route data packets, a network discovery process using a network reachability protocol is initiated to identify routing paths associated with the primary router. A routing table in the primary router is subsequently updated in accordance with the routing paths. When the routing table is completed or at least partially completed in accordance with a predefined condition, a ready message is issued by the primary router to the access switch. Upon receipt of the ready message, the access switch switches network services from the backup router to the primary router.

Figure 1:
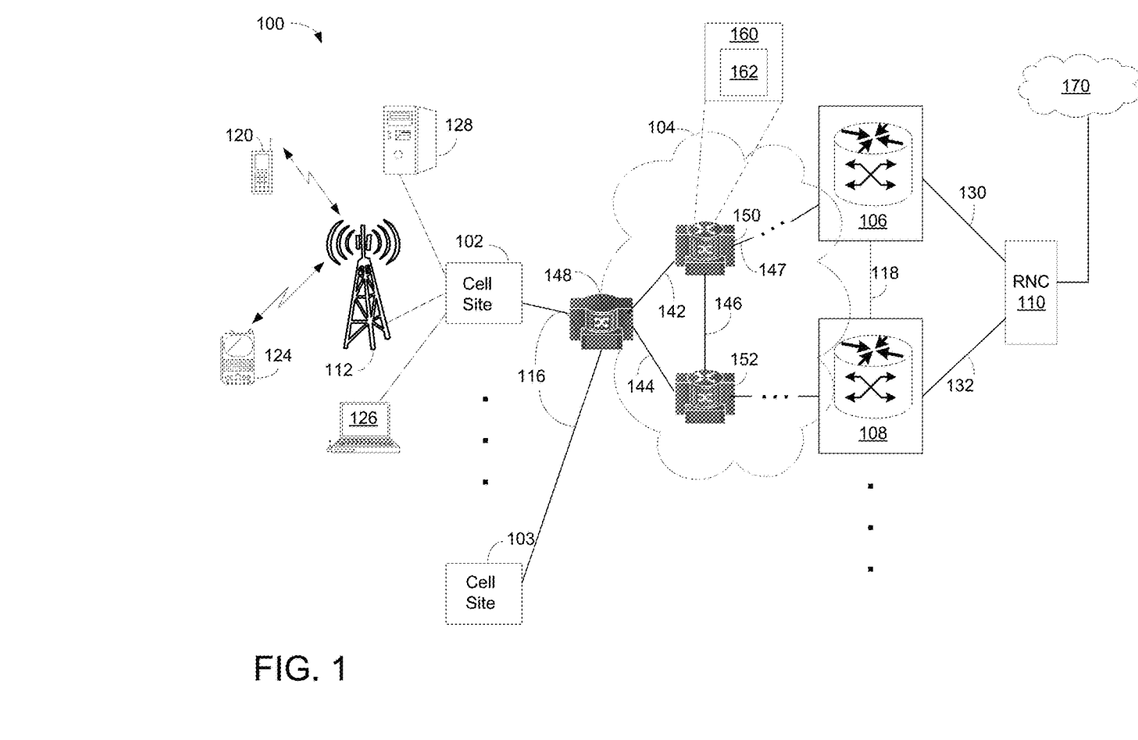
FIG. 1 is a block diagram illustrating a computer network having a primary router and a backup router in accordance with one embodiment of the present invention.

FIG. 1 is a block diagram 100 illustrating a computer network having a primary router and backup router organized in a dual-homing configuration in accordance with one embodiment of the present invention. Diagram 100 includes multiple cell sites 102-103, a switching network 104, multiple routers, and a Radio Network Controller ("RNC") 110. RNC 110 is further coupled with a Wide Area Network ("WAN") and/or Internet 170. Depending on the applications, RNC 110 may be coupled with other RNC or RNCs to enhance network management and capacities. In an alternative configuration, RNC 110 may be replaced with other network element(s) such as gateway(s) and router(s). It should be noted that the underlying concept of the exemplary embodiment(s) of the present invention would not change if one or more blocks (or elements) were added to or removed from diagram 100.

Switching network 104 includes an access switch ("AS") 148, a primary router 150, and a backup router 152 wherein AS 148 and routers 150-152 are configured to form a dual-homed or dual-homing redundancy network configuration. Note that AS 148 can be configured to be at edge and/or outside of switching network 104 and is coupled to one or more cell sites 102-103 via connections 116. Switching network 104 may include additional network elements ("NEs") and/or network management system ("NMS") depending on the applications. Routers 106-108, in one embodiment, can be edge routers and/or routers inside of switching network 104. Switching network 104, in one example, can be an IP and/or Multi Protocol Label Switching ("MPLS") based circuit network which may operate at a layer of Open Systems Interconnection Basic Reference Model ("OSI model"). Network 104 may include a circuit switch block and a backhaul block for transferring information and/or various data traffic to and from network clients.

AS 148, in one embodiment, is a managed edge system and/or management system capable of managing a network, connections, ports, and switching services. For example, AS 148 allows service providers' access networks at traffic aggregation points or cell sites. An advantage of employing AS 148 is that it provides scalable network solution between customer equipment ("CE") and provider edge ("PE") routers for data transfer. Virtual Private LAN Service ("VPLS") provides Ethernet based multipoint to multipoint communication over the IP/MPLS network. The protocols, such as interior border gateway protocol ("iBGP"), MPLS, OSPF, and RSVP (resource reservation protocol), may be used as Layer 2 (L2) VPN-related applications. AS 148, in one example, is capable of performing both access switching functions and router functions.

A router, for example, is an NE or network device capable of forwarding data packets across one or more communication networks in accordance with its routing mechanism such as a routing table. A router may be a microprocessor-controlled computing system which may be coupled to two or more data lines configured to direct data traffic through one or more communication networks. NE or network client, in one example, can include one or more routers, hubs, switches, hosts, base stations, and the like. A NMS, in one aspect, is a computer system or server including hardware and/or software used to monitor and control the network including various NEs. Diagram 100, for example, includes router 106-108 which are capable of routing information between cell sites 102-103 and RNC 110 via switching network 104.

A dual-homed redundancy host, network or gateway is, for example, situated between two interfaces to enhance data integrity or prevent data drop. Dual-homed redundancy, also known as dual-homing, provides two independent data paths for each dual-attached device. AS 148, in one embodiment, is structured in a dual-homed redundancy configuration wherein a primary path 142 is used to connect AS 148 to primary router 150 and a secondary path 144 is used to connect AS 148 to a backup router 152. Under normal conditions, AS 148 transmits data packets to and from primary router 150 via primary path 142. In the event that path 142 or primary router fails, AS 148 switches its connection from primary router 150 to backup router 152 whereby AS 148 can continue network services via a backup route. When primary router 150 recovers from an earlier crash or failure, primary router 150, in one embodiment, informs AS 148 to switch back from backup router 152 to primary router 150 in accordance with delay-switching circuit 160 and content in IP routing table 162.

Primary and backup routers 150-152, for example, are also interconnected by Interior Gateway Protocol ("IGP") 146 for redundancy purposes. Similarly, routers 106-108 are also interconnected by IGP 118. Each router, for example, includes functions of IP routing. Connections 130-132 are used to couple RNC 110 with routers 106-108 wherein connections 130-132 can be land line connections, wireless connections, or a combination of wired and wireless connections.

Cell site 102, also known as a base station, includes a radio tower 112, a computer 126, and a server 128, wherein radio tower 112 further includes a cellular phone 120 and a handheld device 124 connected via wireless communications. Base station or cell site 102 is capable of communicating with mobile devices such as cellular phone 120 and handheld device 124 via radio tower 112. It should be noted that cell site 102, not shown in FIG. 1, may include additional radio towers as well as other land switching circuitry. The cell stations such as cell sites 102-103 can be configured to support wireless communications as well as wired communications. Each cell site such as cell site 102 can be considered as a host and it is capable of maintaining a connectivity session such as a bidirectional forwarding detection ("BFD") session with a destination router for continuously verifying the connectivity between the host and the router.

BFD is a network connectivity protocol used to authenticate or detect failures between two endpoints (i.e., a host and a master router). BFD is a short-duration for failure detection for path(s) between forwarding network elements including interfaces, data links, forwarding planes, and forwarding engines. A session is down if a BFD packet(s) is failed to receive. It should be noted that, instead of using BFD sessions, other connectivity protocols can also be used. For example, Open Shortest Path First ("OSPF"), Intermediate System to Intermediate System ("IS-IS"), and/or any other protocols complying IEEE 802.1ag can be used.

During an operation, after activating backup router 152 for routing services, primary router 150 begins a recovery process to recover itself from inactive status to active status. Once primary router 150 is up and is able to resume network service, primary router 150 reestablishes label-switched path ("LSP") using RSVP via connection 142 between router 150 and AS 148. Similarly, LSPs are also reestablished for other connections such as connections 146-147. After LSPs are reestablished, primary router 150 begins to learn routing paths by activating a network reachability protocol such as BGP or iBGP. Primary router 150 activates delay-switching circuit 160 which monitors BGP sessions and status of routing paths. IP routing table 162 within primary router 150 is updated as additional IP paths are learned or discovered. Once the IP routing table 162 is completed or partially completed in accordance with a predefined condition, an Ethernet Pseudo Wire Emulation ("PWE") between primary router 150 and AS 148 is activated and PWE failure signal is cleared. After receiving a ready message from primary router 150, AS 148 reverts network services from backup router 152 to primary router 150.

It should be noted that the predefined condition(s) can be set for users, providers, or network administrator(s). For example, the predefined condition may set to a minimal number of routing paths which is sufficient for a router to process and route an incoming packet. The predefined condition can also identify which condition to use. For example, the predefined condition may indicate use IP routing table or use IP routing table plus BGP session(s).

In addition to Multi-protocol tunnels, Multi-Protocol Label Switching, Generic Routing Encapsulation ("GRE"), and IPSec (Internet Protocol Security), PWE is also able to emulate VC (Virtual Circuit) channels inside tunnels with multicast features. For example, PWE is able to emulate Ethernet, Frame Relay, ATM, TDM (Time Division Multiplexing), SONET/SDH (Synchronous Optical NETworks/Synchronous Data Hierarchy) and other services across an MPLS/IP network.

An advantage of providing a redundant dual-homing networking solution for L2 PWE is to improve reliability of IP/IP-VPN services. For example, monitoring PWE status, route paths status, and/or status of routing protocols by delay-switching circuit 160 can reduce packet drop or data loss during a switchover or revision of network service.

Figure 2:
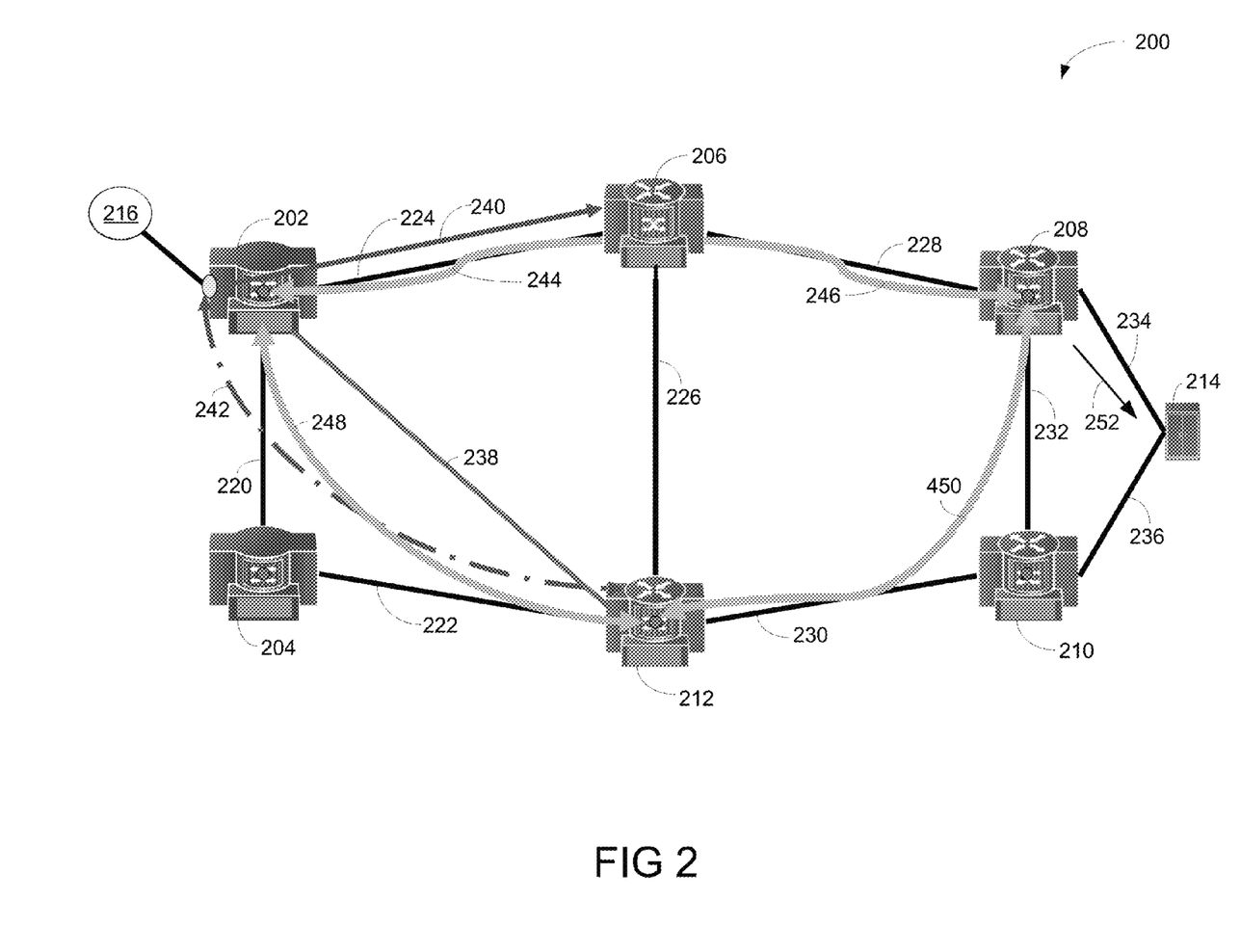
FIG. 2 is a block diagram illustrating an exemplary computer network having multiple network elements and access switches in accordance with one embodiment of the present invention.

FIG. 2 is a block diagram 200 illustrating an exemplary computer network having multiple network elements and access switches ("AS") in accordance with one embodiment of the present invention. Diagram 200 includes ASs 202-204, routers 206-212, RNC 214, and connections 220-238, wherein connection 220-238 are used to interconnect ASs, routers, and RNC. AS 202 is further coupled to a network device 216 such as a base station via a wired or wireless communication network. In one embodiment, AS 202 and router 206 and 212 are formed and/or connected in a dual-homing network configuration wherein router 206 is the primary router and router 212 is the backup router. It should be noted that the underlying concept of the exemplary embodiment(s) of the present invention would not change if one or more blocks (or circuits) were added to or removed from diagram 200.

The dual-homing redundancy network includes an AS 202, a primary router 206, and a backup router 212. In one embodiment, AS 202, which may be edge router or switch, is configured to control connections of network systems situated at edge of a communication network. For example, AS 202 controls connections or ports coupled to router 206, router 212, and AS 204. Backup router 212 is configured to provide an alternative (or backup) routing service for the network device when primary routing service is not available. For example, primary routing service may not be available when the primary router is down. Alternatively, primary routing service is out of service because connection 224 is down. Primary router 206, in one embodiment, includes a delay-switching circuit which provides a delay of switchover to the primary router because the primary router is not ready even though the primary link is up. For example, a router is not able to route any incoming packets when it is still learning the routing paths and updating its routing table.

The delay-switching circuit is also capable of delaying a switchover of network service in response to media access control ("MAC") addresses in the routing table. Furthermore, the delay-switching circuit is further capable of delaying a switchover of network service in response to selected LSPs. It should be noted that PWE 240 is established between AS 202 and primary router 206 to provide primary routing service and PWE 242 is established between AS 202 and backup router 212 to provide the backup or alternative routing service.

L2 PWE, as shown in diagram 200, connects to IP-VPN network providing network service for PWE to VRF (virtual routing and forwarding) network applications and services. Routers 206-212, in one embodiment, use iBGP to learn and identify neighboring NEs or peers. iBGP is a network discovery or reachability tool to identify or map its peer(s) connections and/or paths. While primary path 224 facilitates Ethernet PWE activity 240, backup path 238 facilitates data transmission through Ethernet PWE activity 242 between AS 202 and backup router 212. It should be noted that the backup path can also be formed through connections 220-222 via AS 204.

Under the normal condition, primary router 206 handles and transmits data, data packets, or data stream via data path 244-246 between AS 202 and router 208 via PWE 240 and connection 228. If the destination is RNC 214, data or packets travel via data path 252 from router 208 to RNC 214 via connection 234. If primary router 206 or PWE 240 fails, backup router 212 takes over the data transmission between AS 202 and router 208 via PWE 242 and connections 230-232. If the destination is RNC 214, packets travel from router 208 to RNC 214 via connection 234. Alternatively, packets can also travel from router 210 to RNC 214 via connection 236.

Diagram 200 illustrates a circuit network having attachment circuits for providing IP/IP-VPN service which includes L2 interface(s), such as VLAN, PPP, ATM VC, Frame Relay DLCI, and the like. To reduce packet black holing, the delay-switching circuit, in one embodiment, monitors status such as PWE end-to-end up-or-down status and attachment circuit ("AC") status, and delays a switchover (s) in accordance with the observed status. Table 1, shown below, illustrates an exemplary list of conditions and/or status to be monitored before a switchover takes place.

TABLE 1

| No. | Status |
|---|---|
| a) | route or a set of IP routes within global or local VRF (present or not present) |
| b) | status of selected routing protocols (iBGP up/down) |
| c) | presence of MAC addresses in the routing tables (present/not present) |
| d) | selected LSP (example up or down) |
| e) | status of selected standard connectivity verification protocols defined for various technologies (i.e., BFD, 802.1ag) that can perform functions on interface(s) that is not necessary AC of PWE |

During an operation, the delay-switching circuit, in one embodiment, is able to issue a switching or reverting notice to AS 202 based on the observed status as shown in Table 1. For instance, when the routing table contains a complete set or a partially complete set of IP route paths, the delay-switching circuit sends a ready message to AS 202 informing AS 202 to perform a switchover. Note that the partially complete set of IP route paths is a predefined or predetermined portion of IP route paths that is sufficient to route incoming data to its destination based on the available route paths. Upon receipt of the ready message, AS 202 reverts network service from backup router 212 to primary router 206. It should be noted that when a switch or reversion of network service is based on status of PWE and status of selected routes (and/or iBGP session(s)), primary router such as router 206 is ready to route coming data as soon as the reversion takes place.

An advantage of using PWE using dual-homing or dual-homed network protection can enhance reliability of the communication network.

Figure 3:
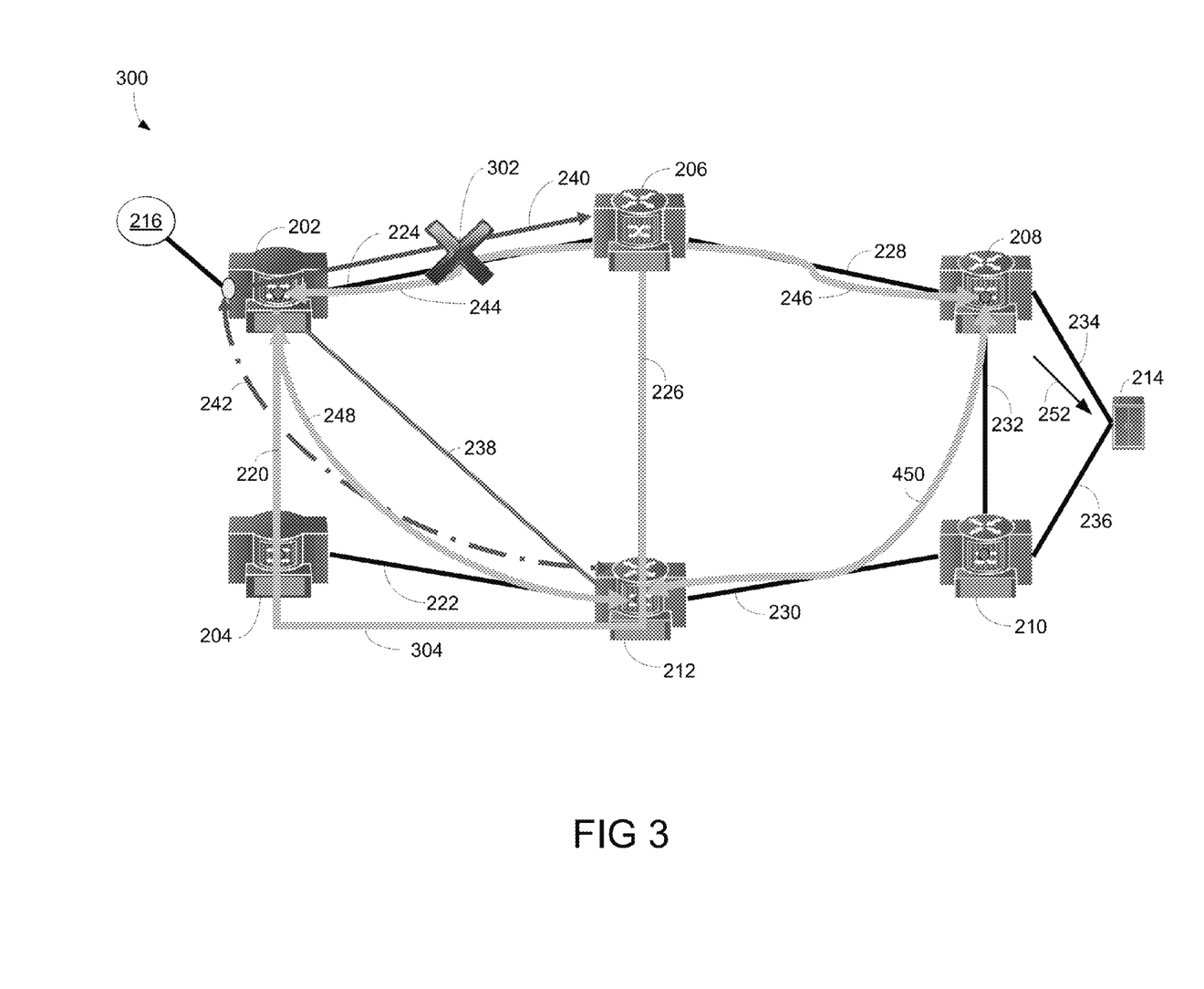
FIG. 3 is a block diagram illustrating an exemplary process of rerouting data through a backup path upon identifying link failure in accordance with one embodiment of the present invention.

FIG. 3 is a block diagram 300 illustrating an exemplary process of rerouting data through a backup path upon identifying primary link failure in accordance with one embodiment of the present invention. Diagram 300, which is similar to diagram 200 shown in FIG. 2, includes ASs 202-204, routers 206-212, RNC 214, and connections 220-238, wherein connection 220-238 are used to interconnect ASs, routers, and RNC. AS 202 is further coupled to a network device 216 such as a base station via a wired or wireless communication network. In one embodiment, AS 202 and router 206 and 212 are formed and/or connected in a dual-homing network configuration wherein router 206 is the primary router and router 212 is the backup router. It should be noted that the underlying concept of the exemplary embodiment(s) of the present invention would not change if one or more blocks (or circuits) were added to or removed from diagram 300.

When the primary link or link 224 fails as numeral 302 indicated during PWE to VRF network operation, a backup router such as router 212 automatically takes over the responsibility of network service or routing service between AS 202 and router 206. For example, upon identifying link failure 302, backup router 212 activates Ethernet PWE or PWE 242 and takes over the network routing task. After PWE 242 is activated, a new data path 304 is established via links 220-222 and 226. Alternatively, new data path 304 can also be formed through links 238 and 226. While primary router 206 is able to continue receiving and processing packets or data streams from AS 202 through backup router 212 and link 226, primary router 206 begins to recover or repair the down link such as link 224.

Figure 4:
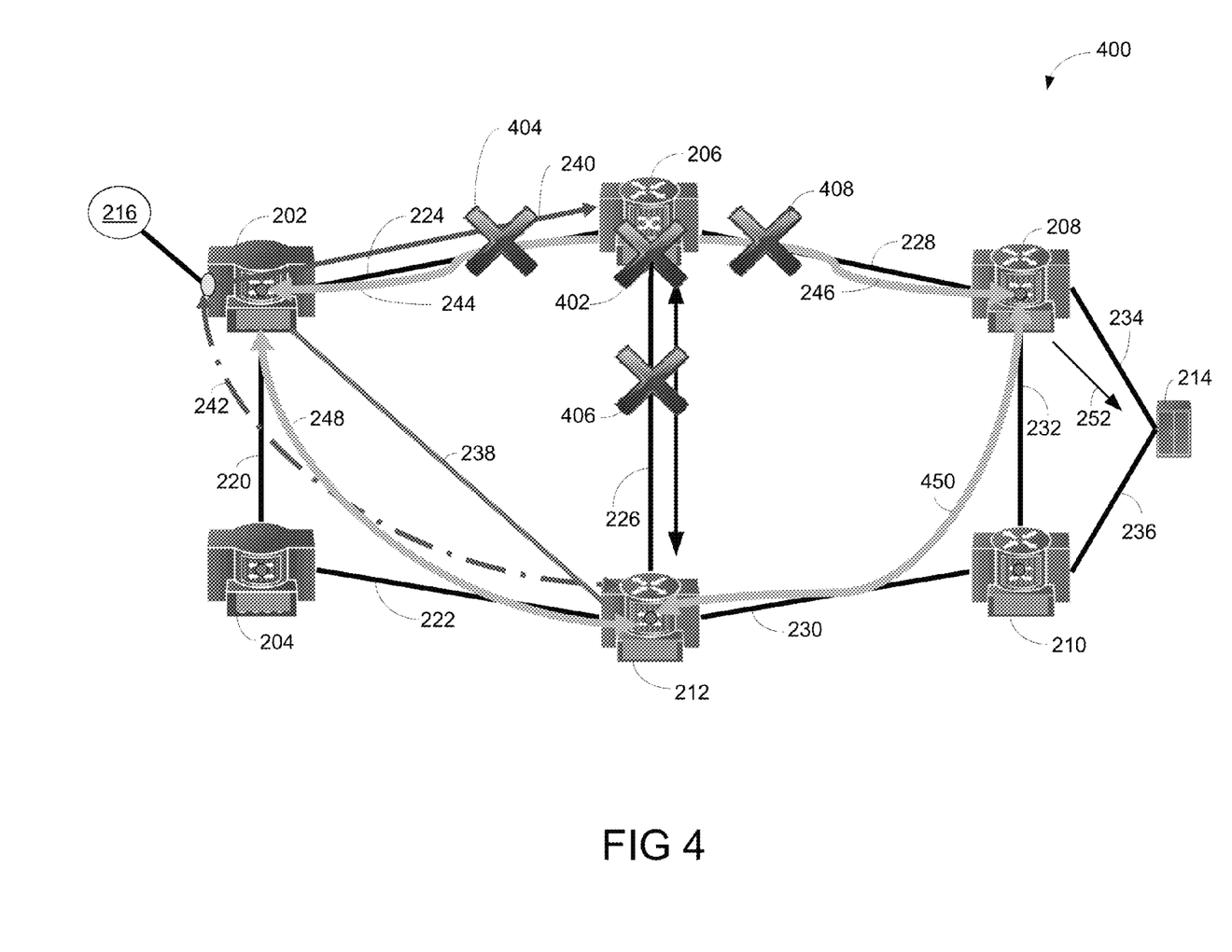
FIG. 4 is a diagram illustrating an exemplary process of rerouting data through a backup path upon identifying node or primary node failure in accordance with one embodiment of the present invention.

FIG. 4 is a diagram illustrating an exemplary process of rerouting data through a backup path upon identifying node or primary node failure in accordance with one embodiment of the present invention. Diagram 400, which is similar to diagram 200 shown in FIG. 2, includes ASs 202-204, routers 206-212, RNC 214, and connections 220-238, wherein connection 220-238 are used to interconnect ASs, routers, and RNC. In one embodiment, AS 202 and router 206 and 212 are formed and/or connected in a dual-homing network configuration wherein router 206 is the primary router and router 212 is the backup router.

When the primary node or primary router 206 fails as numeral 402 indicated during a PWE to VRF network operation, a backup router such as router 212 automatically takes over the responsibility of network service or routing service between AS 202 and router 208. When primary router 206 fails, internal iBGP session goes down and primary node crashes or goes down. After primary node goes down, RSVP LSPs declare down over links 224-228 and link failures 404-408 occur. PWE 240 subsequently goes down and data paths 244-246 are removed upon detecting iBGP session time out and/or multiprotocol (mp)-BGP session ends.

Upon identifying router failure 402 and link failures 404-408, backup router 212 activates Ethernet PWE or PWE 242 and takes over the network routing task for AS 202. New data paths 248 and 450 are established via links 238 and 230-232. The routing service or network service between AS 202 and RNC 210, for example, is rerouted through data paths 248, 450, and 252. Alternatively, the new data path between AS 202 and RNC 210 can also be established via links 238, 230, and 236 through routers 212-214. While backup router 212 routes data packets or data streams between AS 202 and RNC 210, primary router 206 begins to recover from router failure 402 and link failure 404-408.

Figure 5:
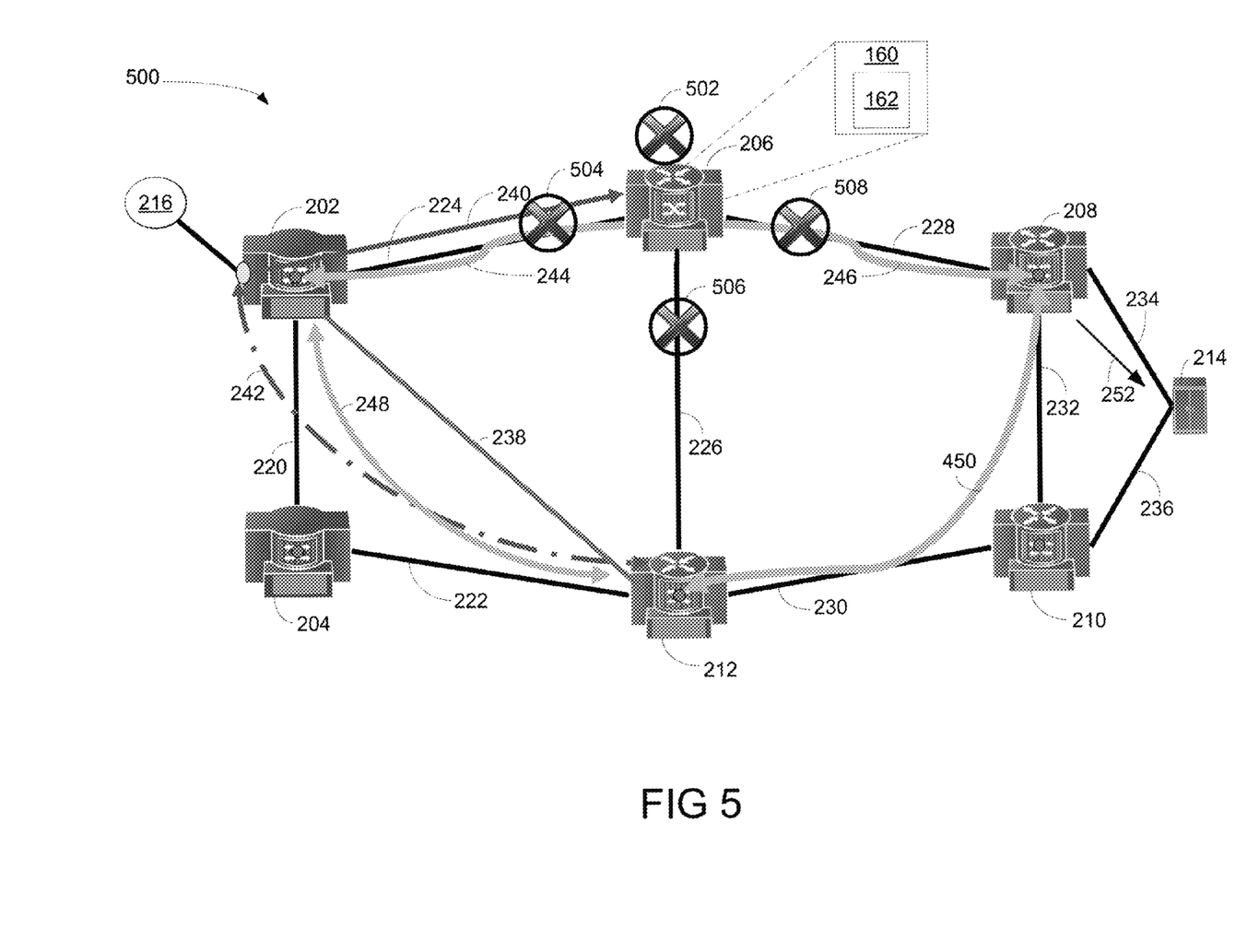
FIG. 5 is a diagram illustrating a recovery from a node failure using a delay-switching circuit to prevent black holing traffic in accordance with one embodiment of the present invention.

FIG. 5 is a diagram illustrating a recovery process of a node failure using a delay-switching circuit to prevent black holing traffic in accordance with one embodiment of the present invention. Diagram 500, which is similar to diagram 400 shown in FIG. 4, includes ASs 202-204, routers 206-212, RNC 214, and connections 220-238, wherein connection 220-238 are used to interconnect ASs, routers, and RNC. While diagram 400 shown in FIG. 4 illustrates a process of performing a switchover from primary router 206 to backup router 212 due to device failure, diagram 500 illustrates a process of performing a switchback or a reversion from backup router 212 to primary router 206 once primary router 206 is recovered from the device failure.

When a primary node or primary router 206 in the PWE to VRF network operation recovers or resumes from an earlier failure 502, a delay-switching circuit 160 of primary router 206 delays a switchback or reversion of network routing from backup router 212 in accordance with one or more predefined conditions. The predefined conditions, as discussed earlier, includes, but not limited to, routing paths listed in routing table 162, iBGP session/route status, mp-BGP status, and the like. To prevent black holing traffic during the switchback or reversion of network routing, delay-switching circuit 160 is able to reduce and/or prevent scenario of black hole traffic. The black holing traffic or black hole means when data traffic or data packet is discarded or dropped during a transmission to a recipient or destination without informing the source or destination that the data traffic did not reach its intended recipient.

Upon resumption of primary router 206 from failure 502, LSPs are reestablished over links 224-228 in a sequentially or substantially simultaneous depending on the number of routers. After link 228 is up, iBGP session and/or monitored route is up and running. Mp-iBGP is subsequently reestablished between routers 206-208. In one embodiment, delay-switching circuit 160 activates network discovery process using mp-iBGP to identify paths and/or alternative paths such as the paths between router 206 and RNC 210. The identified paths, for example, are stored in routing table 162. When routing table 162 is completed or partially completed depending on the predefined conditions, PWE 240 is reestablished and PWE failure signal is cleared. Once Ethernet PWE 240 is activated, delay-switching circuit 160 sends a ready message to AS 202 indicating that PWE 240 and primary router 206 are ready to resume network routing services. The network service is reverted or switched from backup router 212 to primary router 206. Upon reestablishing data paths 244-246, Ethernet PWE 242 is deactivated and backup data paths 248-450 are removed.

For a circuit switching network, a link or a channel can be established between multiple nodes and/or terminals to facilitate network communication. It should be noted that a link or a circuit or a channel acts as an electrical circuit physically connecting two nodes, two NEs, or two network devices. During a network discovery process, every NE as well as network circuit needs to be discovered and/or initialized by NMS or NMSs before each NE can access the network. Network discovery process can take time and resources for each NMS to complete a network configuration and/or a network discovery process. In another example, a network element discovery may be required when a primary router switches over to a backup router or vice verse.

An advantage of using the delay-switching circuit is that PWE does not revert until the primary router is ready whereby black holing traffic can be reduced. It should be noted that primary router 206 is able to select peer(s) or route(s) status as AC status in response to iBGP sessions. Primary router 206, in one embodiment, is able to map PWE status message such as up-or-down in order to prevent potential black holing scenarios.

Figure 6:
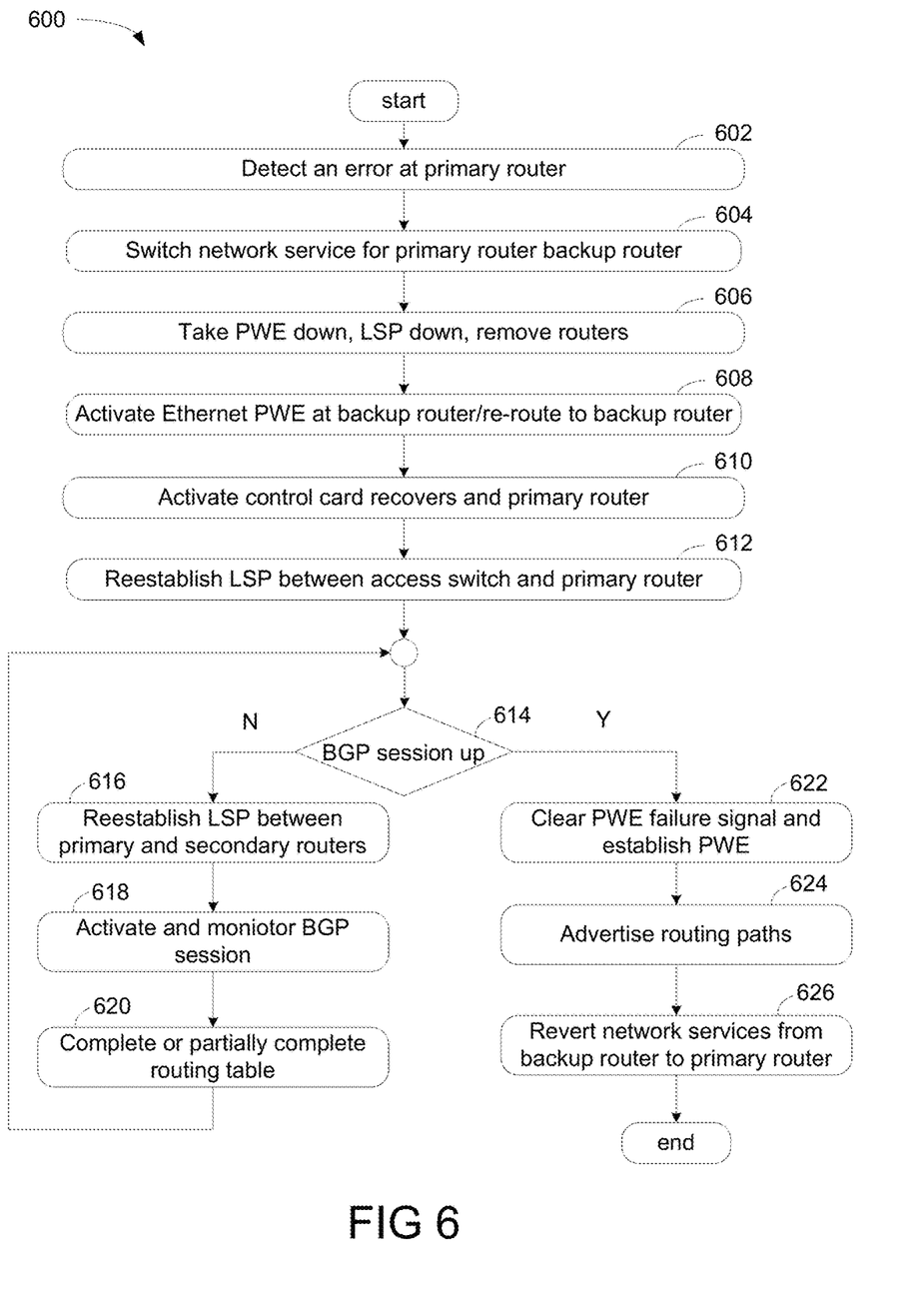
FIG. 6 is a logic diagram illustrating an exemplary process of control flow during a PWE to VRF network operation having dual-homing protection in accordance with one embodiment of the present invention.

FIG. 6 is a logic diagram 600 illustrating an exemplary process of control flow during a PWE to VRF network operation having dual-homing protection in accordance with one embodiment of the present invention. The process detects an error at the primary router at block 602. The error, which can be an operational error or system error, causes the system or the primary router to crash. When the primary router is shutting down due to the error, the network service is switched from the primary router to the backup router at block 604. After the primary router is down, PWE between AS and primary router is torn down at block 606. Once LSP is down, the primary router is logically removed. The Ethernet PWE between the backup router and AS is activated and new routing path(s) is established at block 608. While the backup router provides network service such as routing data to and from AS, the primary router begins to repair and/or remove the error(s).

When the primary router including its control card are activated at block 610, LSP between primary router and other network devices including neighboring routers or peers are reestablished at block 612. The process proceeds to block 616 if the BGP session is not up yet. Otherwise, the process moves to block 622. LSPs between the primary router and the secondary routers are reestablished at block 616. While BGP session is activated and monitored at block 618, the routing table, at block 620, may be completed or at least partially completed in response to a network discovery process. The process subsequently proceeds to block 614 to exam the status of BGP session. At block 622, PWE between primary router and AS is reestablished and PWE failure signal is cleared. Upon advertizing routing paths at block 624, the network service is reverted from backup router to primary router at block 626.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 7:
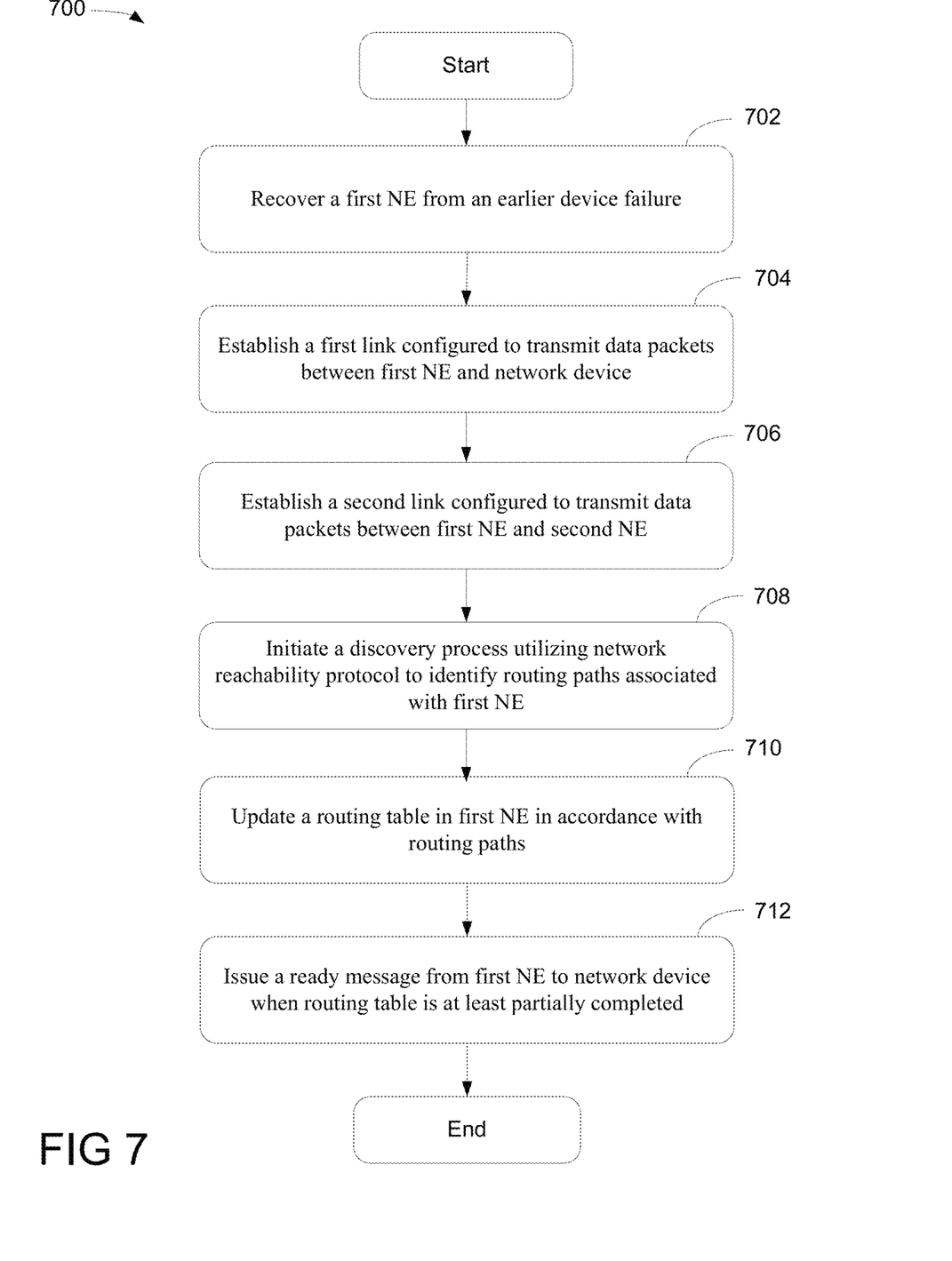
FIG. 7 is a flowchart illustrating a router recovery process which reduces data loss during a switchover between a backup router to a primary router in accordance with one embodiment of the present invention.

FIG. 7 is a flowchart 700 illustrating a router recovery process which reduces data loss during a switchover between a backup router and a primary router in accordance with one embodiment of the present invention. At block 702, a recovery process using dual-homing protection is capable of recovering a first NE from an earlier device failure. The first NE, in one aspect, is primary router. Upon detecting an error associated with the first NE, the first NE is shutting down for error recovery. The network service is switched from the first NE to a backup NE wherein the backup NE takes over the routing task from the first NE. Upon removing the error, the first NE resumes routing functions and changes its status from inactive to active.

At block 704, a first link configured to transmit data packets between the first NE and a network device is reestablished. In one embodiment, the process restores a connection for data transfer between a first router and an access switch. While an NE can be a router, the access switch may be an edge router or switching hub.

At block 706, a second link configured to transmit data packets is reestablished between the first NE and a second NE. The process, in one example, is able to repair a logical network connection between the first router and a second router using RSVP LSP.

At block 708, a discovery process using network reachability protocol such as iBGP is initiated to identify routing paths associated with the first NE. For example, the first NE learns alternative routing paths between the first NE and other nodes.

At block 710, a routing table in the first NE is updated in accordance with the routing paths discovered from the network discovery process. For example, the discovered or identified routing paths are recorded in the routing table. The content of routing table will be used for routing.

At block 712, a ready message from the first NE is issued to the network device when the routing table is at least partially completed. In one embodiment, the process informs the access switch to revert from a backup NE to the first NE for the subsequent network services. A data packet such as an incoming data stream is subsequently sent from the network device to the first NE. The data packet is routed or forwarded to its destination in accordance with the routing table.

Figure 8:
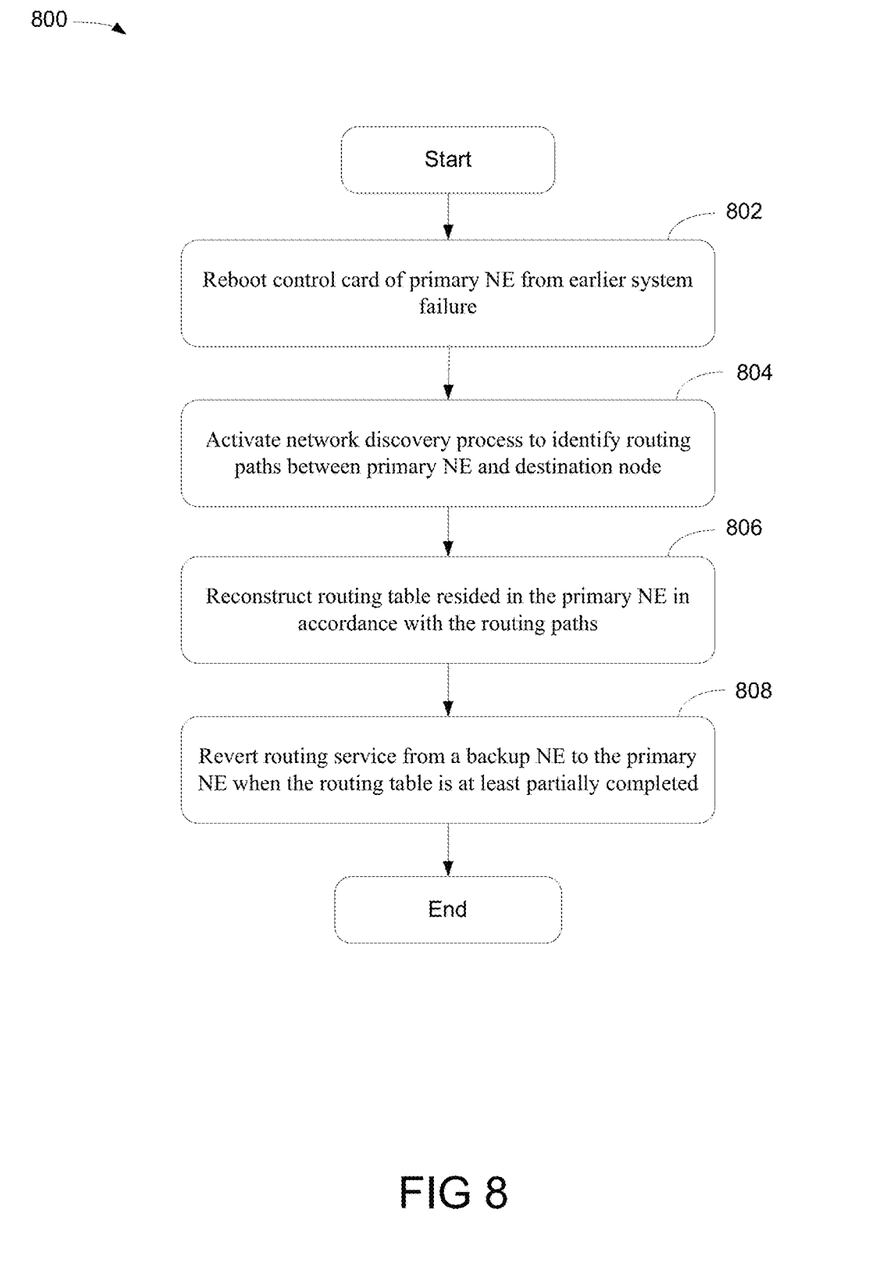
FIG. 8 is a flowchart illustrating an alternative embodiment of a recovery from a device failure during a switchover between a backup router and a primary router in accordance with one embodiment of the present invention.

FIG. 8 is a flowchart 800 illustrating an alternative embodiment of a recovery from a device failure during a switchover between a backup router and a primary router in accordance with one embodiment of the present invention. At block 802, a recovery process reboots a control card of a primary NE from an earlier system failure. Before system failure, the process is able to identify an error during the network communication between the primary NE and an access switch and subsequently, the primary NE is temporary inactivated whereby an error recovery process can be executed. The network service is switched from the primary NE to a backup NE. Once the primary NE is up, a first link capable of transmitting data between the primary NE and the access switch is reestablished. A second link configured to transmit data packets between the primary NE and a secondary NE is also resumed.

At block 804, a network discovery process is activated to identify routing paths between the primary NE and a destination node. In one example, a routing map is created during the discovery process.

At block 806, a routing table resided in the primary NE is reconstructed or reloaded in accordance with discovered or identified routing paths. The routing table will be used for subsequent packet routing.

At block 808, the process reverts routing service from a backup NE to the primary NE when the routing table is at least partially completed. Upon receiving a data packet from the access switch to the primary NE, the process routes the data packet to the RNC in accordance with the routing table. Before reversion of the routing service, a ready message is sent to an access switch in accordance with IP routes of virtual routing and forwarding ("VRF"). In one embodiment, the process is capable of sending a ready message to an access switch in accordance with MAC addresses in the routing table. Alternatively, the process sends a ready message to an access switch in accordance with selected LSPs in the routing table.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for recovering network routing in a communication network, comprising:
    switching network service from a first network element ("NE") to a backup NE in response to an earlier device failure associated with the first NE;
    recovering the first NE from the earlier device failure;
    establishing a first link configured to transmit data packets between the first NE and a network device after the first NE is recovered from the device failure;
    initiating a discovery process utilizing network reachability protocol to identify a plurality of routing paths associated with the first NE while network communication between the network device and a second NE is facilitated by the backup NE;
    updating a routing table in the first NE in accordance with the plurality of routing paths; and
    issuing a ready message from the first NE to the network device indicating reverting network service from the backup NE to the first NE when the routing table contains at least a portion of completed routing information.

2. The method of claim 1, further comprising,
    detecting an error associated with the first NE; and
    shutting down the first NE for error recovery.

3. The method of claim 2, further comprising:
    receiving a data packet from the network device to the first NE; and
    routing the data packet to its destination node in accordance with the routing table.

4. The method of claim 1, wherein recovering the first NE from the earlier device failure includes resuming routing function from halting status.

5. The method of claim 1, wherein establishing the first link configured to transmit the data packets between the first NE and the network device includes restoring a connection for data transfer between a first router and an access switch.

6. The method of claim 1, further comprising establishing a second link configured to transmit the data packets between the first NE and the second NE wherein establishing includes repairing a network connection between the first router and a second router.

7. The method of claim 1, wherein initiating the discovery process utilizing network reachability protocol to identify a plurality of routing paths associated with the second link includes learning alternative routing paths between the first NE and other nodes.

8. The method of claim 1, wherein updating the routing table in the first NE in accordance with the plurality of routing paths includes recording the routing paths in the routing table which is used for routing the data packets.

9. The method of claim 1, wherein issuing the ready message from the first NE to the network device when the routing table contains at least a portion of completed routing information includes informing an access switch to revert from a backup NE to the first NE for subsequent network services.

* * * * *